May 22, 1951   W. M. SMITH   2,554,275
COMBINATION ALKYLATION AND POLYMERIZATION PROCESS
Filed Nov. 20, 1947
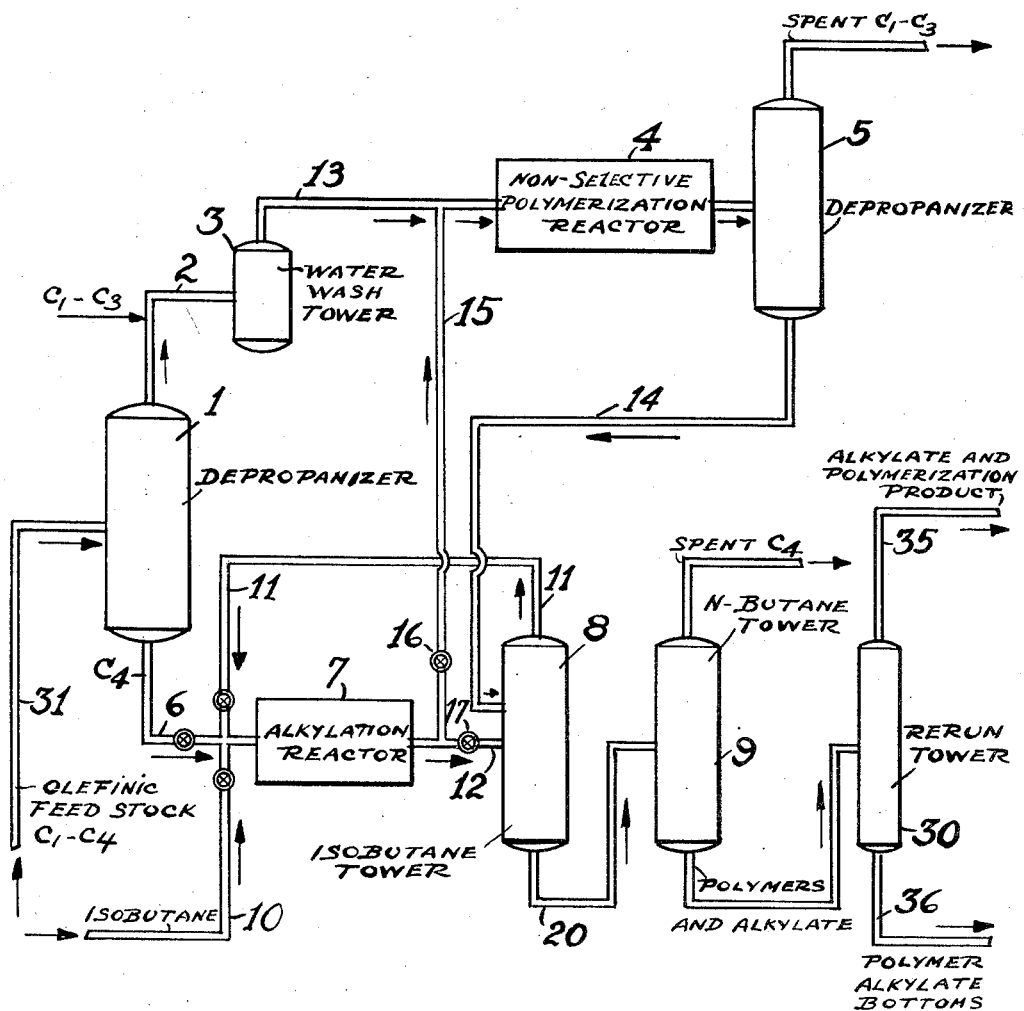
William M. Smith Inventor
By W. T. Heilman Attorney Patented May 22, 1951

2,554,275

UNITED STATES PATENT OFFICE 2,554,275

COMBINATION ALKYLATION AND POLYMERIZATION PROCESS

William M. Smith, Roselle, N. J., assignor to Standard Oil Development Company, a corporation of Delaware Application November 20, 1947, Serial No. 787,242

2 Claims. (Cl. 260—683.15)

The present invention relates to a process for producing normally liquid saturated hydrocarbons suitable for motor fuels, from relatively low-boiling hydrocarbon constituents. In particular, this invention concerns a novel combination of alkylation and polymerization processes wherein the product of the alkylation reaction is cycled through the polymerization reactor serving as a diluent in the polymerization process.

It is known in the art that saturated hydrocarbons containing a tertiary carbon atom, that is, iso-paraffinic hydrocarbons, will react with olefins in the presence of a suitable catalyst resulting in the production of a wide range of higher boiling hydrocarbon products. The nature of these reactions, which are called alkylation reactions, varies widely with the reaction conditions and with the particular type and character of feed materials employed. The feed stocks which are used in reactions of this character vary considerably. The iso-paraffinic constituent of the feed stock usually comprises isobutane, isopentane, and similar higher branched chain homologues containing at least one tertiary carbon atom per molecule. The olefinic constituent of the feed stock generally comprises propylene, normal butylene, isobutylene, trimethylethylene, the isomeric pentenes, and similar higher monoolefinic hydrocarbons of either a straight chain or a branched chain structure. Mixtures of 2 or more of these monoolefins are likewise employed. In certain operations, the feed material comprises refinery cuts segregated from various cracking and distillation operations such as propane, butane, and pentane cuts which contain olefinic constituents boiling in the respective boiling ranges.

The catalyst generally employed in alkylation processes comprises a concentrated mineral acid, as for example, a sulfuric acid, a halogenated sulfuric acid, an acid of phosphorus, or an equivalent acid. Other catalysts utilized are boron fluoride, the metal halides such as aluminum halide, and iron halide, acid-activated clays, as well as the mineral acids employed in conjunction with various compounds of group V of the periodic system, aluminum halide, alkali metal halides, double salt complexes, and various other similar catalysts. When a mineral acid is utilized as the catalyst, the acid concentration is above about 80%, preferably in the range from about 90% to about 95%. Although a wide range of operating temperatures are employed, the reaction is usually conducted at a relatively low temperature, that is, of the order of about 30° F. to about 100° F., preferably between about 40° F. and 70° F. The time of the reaction varies considerably but in general is in the range of about 5 minutes to about 2½ hours or longer depending upon related operating conditions. Usually, the reaction time is in the range from about 10 to about 60 minutes.

The alkylation reaction may be carried out in the vapor phase but is generally conducted in the liquid phase. In liquid phase operation, the pressures are at least sufficient to keep the respective reactants from vaporizing and are usually in the range from about 0 to 12 atmospheres, although pressures as high as 100 atmospheres may be employed, depending upon the reaction temperature.

In these reactions, equal molecular quantities of isoparaffins and mono-olefins may be used. However, it has been found that it is desirable to maintain a considerable excess of the tertiary hydrocarbons in the reaction zone and to operate in a reaction medium containing an excess of the catalyst composition. For example, in an operation wherein isobutane or isopentane is employed as the iso-paraffinic reactant, the mol ratio ranges from about 1 to as high as 30 mols and higher of isoparaffin per mol of mono-olefin present.

It is also known in the art to polymerize normally gaseous olefins to saturated hydrocarbon constituents of high octane number boiling within the gasoline boiling range and having a high anti-knock value. A variety of base stocks may be used resulting from different refinery operations but in general comprise olefins containing from 2 to 5 carbon atoms in the molecule. The polymerization reaction is classified as "a selective process" or as a "non-selective process."

The non-selective polymerization process is carried out employing a feed stock of olefinic $C_3$, $C_4$, $C_5$ hydrocarbons, or mixtures of any or all of these hydrocarbons. While a variety of catalysts may be employed, that commonly used is a phosphoric acid catalyst supported on kieselguhr or other type of carrier. A temperature of about 300° to 500° F., is used with a corresponding pressure of about 200–1000 p. s. i. In general high pressures are preferred in carrying out the polymerization reaction. A high conversion is obtained in the range of 90%–100% depending on feed stocks and the polymerization conditions.

In the selective polymerization process the feed stock comprises a $C_4$ hydrocarbon cut. The polymerization reaction essentially occurs between the isoparaffinic and the normal paraffinic constituents with the formation of codimers. This product is then hydrogenated to form the hydro-codimers. The selective polymerization process is carefully controlled by regulating the temperature and pressure to obtain the desired conversion. In general a temperature between about 280° F. to 400° F., and a pressure of about 500 to 1000 p. s. i., is employed.

It has been found that in order to get the highest quality product from either the alkyation or polymerization reactions, it is necessary to treat the feed stock to remove sulfur compounds. A variety of methods to remove sulfur compounds are used. For example, the feed stock may be contacted with bauxite at elevated temperatures, or the feed stock may be treated with sulfuric acid, or the feed stock may be treated with an alkali metal phosphate solution or an amine solution.

As stated, either alkylation or polymerization processes are used to prepare gasoline fuel. Many refining plants use both of these processes. Heretofore, it has been the general practice to operate these processes independent of each other, utilizing complete plant installations for both processes. It is a particular object of the present invention to integrate the two processes in such a manner that material savings in apparatus costs result.

The present invention is based on the principle that the polymerization process is a violently exothermic reaction, so that for best results it is necessary to dilute the reactants whereby better temperature control is maintained and the quality of the polymerized product is improved. It is conventional practice to follow the polymerization reactor with a debutanizing tower wherein $C_4$ hydrocarbons are removed as the overhead product and recycled into the polymerization reactor for use as a diluent. It is an advantage of the present process that this debutanizing tower of the polymerization plant and the associated recycling lines are not necessary. This is accomplished by circulating the alkylation product through the poymerization reactor, using the alkylation product as the diluent rather than fractionating and recycling the $C_4$ hydrocarbons of the polymerization reaction. It will be apparent of course that by eliminating the debutanizing tower normally used in the polymerization plant, a somewhat larger debutanizing tower will be required to accommodate both the alkylation product and the polymerization product. However, a saving in investment and operating cost is nonetheless realized.

In circulating the alkylation product, through the polymerization reactor, a further advantage may be achieved in that the polymerization conditions of temperature, pressure, and catalyst are such that some isomerization of the alkylation product may occur. By this means, the quality of the alkylation product may be somewhat improved, resulting in a higher octane number.

Further objects and advantages of my invention will be appreciated from the following description of a specific embodiment of my invention. The accompanying drawing shows diagrammatically a flow plan according to the process of the present invention.

The feed stock used in the process should be olefinic hydrocarbon fractions consisting of either the $C_1$-$C_4$ hydrocarbon cut or the $C_1$-$C_5$ hydrocarbon cut normally produced from refinery thermal or catalytic cracking operations.

For the purposes of illustrating the process, it will be assumed that a $C_1$-$C_4$ hydrocarbon fraction is used. As stated, it is preferable that this feed stock be purified in a manner not shown in the drawing to remove sulfur compounds. The properly selected and purified feed stock is introduced through line 31 into depropanizer 1 of Figure 1. This depropanizer is operated as a fractionator to remove the $C_1$-$C_3$ hydrocarbons as an overhead product leaving the $C_4$ hydrocarbons as a bottoms product.

The $C_1$-$C_3$ overhead is conducted by line 2 to the polymerization section of the process. Units 3, 4, and 5 are used for polymerization. The $C_4$ bottoms product of the depropanizer 1 is conducted through line 6 into the units 7 and 8 for alkylation to be carried out. In describing the process of the present invention the alkylation process will first be described, then the polymerization process will be described as combined with the alkylation process in accordance with my invention.

The alkylation reaction is the combination of a tertiary hydrocarbon with $C_4$ olefins to produce a $C_8$ alkylate. It is preferred in the present process to use isobutane as the tertiary hydrocarbon. Isobutane obtained from associated refinery processes is introduced into the alkylation reactor through line 10. Alternatively sufficient isobutane may be contained in the olefinic feed stock introduced through line 6. Any desired type of alkylation reactor may be used. For example, the type of reactor disclosed by U. S. Patent No 2,233,802 may be employed.

An alkylation temperature of about 35-65° F. is used. It is essential in producing an alkylate of good quality that the reaction be carried out under carefully controlled conditions. I prefer to use a sulfuric acid alkylation catalyst having a volume ratio as compared to the hydrocarbons of approximately 1:1. For best alkylation results, it is required that the hydrocarbon remain in the reactor for at least 30 minutes time and the volume ratio of isobutane to olefin in the total hydrocarbon feed should be approximately 5.5:1. This ratio is maintained by the proper control of fresh isobutane feed through lines 6 and 10 and recycled isobutane through line 11. The alkylation effluent resulting from the alkylation reaction consists of isobutane, normal butane, and alkylate which is olefin-free. This alkylation effluent is introduced into isobutane tower 8 through line 12.

The isobutane tower 8 should be capable of producing isobutane of at least 85% purity which is recycled to the alkylation reactor through line 11. The bottoms product from the tower is withdrawn through line 20 and is introduced into the normal butane tower 9. The bottoms product of the normal butane tower should contain no more than 1% of isobutane.

The overhead of the normal butane tower is thus $C_4$ hydrocarbons which may be removed to storage for use as fuel. As the process has been described heretofore, the bottoms product of tower 9 is the desired alkylate suitable for high-grade motor fuels. It is generally desirable to rerun, or redistil the alkylate product obtained from the bottom of the normal butane tower 9. This may be accomplished as shown in the drawing by introducing the alkylate product into the rerun tower 30, operated as a fractionator to get a final product of better quality. The final product is withdrawn from the rerun tower overhead through line 35, while the lower grade bottoms are withdrawn through line 36.

Having now described the essential features of the alkylation operation, the polymerization process as combined with the alkylation process will be described. The $C_1$-$C_3$ hydrocarbon fraction obtained as the overhead of depropanizer 1 is submitted to a water wash in the scrubber 3 and is then introduced into the polymerization reactor 4 through line 13, together with a portion of the effluent of the alkylation reactor carried through line 15. The polymerization reactor may be of any desired type and may utilize any desired catalyst for the polymerization process. However, in the practice of the process of the present invention, I prefer to use a non-selective polymerization reactor and a catalyst consisting of phosphoric acid supported on a suitable material. The pressure maintained in the polymerization reactor is in the range of about 500-1000 p. s. i. but is preferably in the range of 1000 p. s. i. The reaction temperature is in the range of 300° to 500° F. but preferably the temperature is maintained in a range from 375°-450° F. As good temperature control is required, the reactor is so constructed that a suitable heat exchange medium may be used to maintain the desired reaction temperature. For example, the reactor may be jacketed permitting water condensate to be circulated through the jacket.

The volume of catalyst employed should be sufficient to secure maximum conversion of olefins at the temperature and pressure conditions employed.

As discussed before, it is essential to properly control the polymerization reaction that a diluent be added to the reactant. According to the present invention, the diluent used is the product of the alkylation reaction which is introduced into the polymerization reactor through line 15 by proper control of valves 16 and 17. Valves 16 and 17 are adjusted as desired to introduce the proper quantity of diluent into the polymerization reactor chamber. This circulation of the alkylation product through the polymerization reactor is not only useful as a diluent in the polymerization reaction, but also may be effective in improving the quality of the alkylation product.

Following the polymerization reactor is a product depropanizer 5.

Depropanizing tower 5 removes the unreacted $C_1$-$C_3$ hydrocarbons which may be removed and used for fuel purposes. The bottoms product of this tower is the desired polymerized hydrocarbons plus the effluent alkylation reactor product which may be drawn off through line 14. According to the process of the present invention, the polymer plus recycle alkylate effluent is introduced into the isobutane tower 8 of the alkylation reaction through line 14. In tower 8 the polymerized product is combined and mixed with the alkylation product and proceeds with the alkylation product through towers 8, 9 and 30. The final product, which is a combination of the polymerized and alkylated products, is then drawn off as the overhead fraction of tower 30.

The combined polymerized and alkylated product obtained from this process consists of saturated hydrocarbons of high octane number suitable for use as a premium motor fuel.

It is to be understood that many modifications of my process may be made and that the scope of my invention is not to be limited by the specific details of the process described. It is, for example, apparent that many standard engineering practices may be adopted to modify and improve the process described. Again, a wide range of hydrocarbon compositions and operating conditions may be utilized within the scope of my invention. It is desired that the scope of my invention be limited only by the appended claims.

I claim:

1. In the conversion of normally gaseous olefinic hydrocarbons to saturated hydrocarbons boiling in the gasoline boiling range by alkylation and polymerization processes, the improvement which comprises passing the alkylation effluent through the polymerization reactor during the polymerization reaction whereby the alkylation effluent serves as a diluent in the polymerization reaction, and whereby the said alkylation product, and the polymerization product are combined and thereafter jointly removing the propane, isobutane and normal butane from the combined alkylation product and polymerization product.

2. An integral process for alkylating and polymerizing $C_1$ to $C_5$ hydrocarbons including olefins and paraffins comprising segregating said hydrocarbons into a $C_1$-$C_3$ fraction and a $C_4$-$C_5$ fraction, reacting said $C_4$-$C_5$ fraction with isobutane in the presence of sulfuric acid at a temperature of about 35-65° F. in the liquid phase and polymerizing said $C_1$-$C_3$ fraction in the presence of a phosphoric acid catalyst at a temperature between 300 and 500° F. and under pressures of between 500 and 1000 pounds per square inch, passing the effluent from the alkylation reaction through the polymerization reactor whereby the alkylation effluent serves as a diluent in the polymerization reaction and whereby the alkylation product and the polymerization product are combined, thereafter fractionating the combined alkylation and polymerization product to obtain the desired motor fuel.

WILLIAM M. SMITH.

REFERENCES CITED

The following references are of record in the file of this patent:

UNITED STATES PATENTS

| Number | Name | Date |
|---|---|---|
| 2,268,557 | Allender | Jan. 6, 1942 |
| 2,286,504 | Parker | June 16, 1942 |
| 2,374,996 | Herthel | May 1, 1945 |
| 2,381,198 | Bailey et al. | Aug. 7, 1945 |
| 2,401,859 | Clarke | June 11, 1946 |
| 2,439,021 | Quigg | Apr. 6, 1948 |